US011469621B2

United States Patent
Lee et al.

(10) Patent No.: US 11,469,621 B2
(45) Date of Patent: Oct. 11, 2022

(54) WIRELESS CHARGING APPARATUS USING MULTIPLE COILS AND WIRELESS CHARGING SYSTEM COMPRISING THE SAME

(71) Applicant: LG ELECTRONICS INC., Seoul (KR)

(72) Inventors: Eunsoo Lee, Seoul (KR); Jaesoon Kwon, Seoul (KR); Hwanyong Kim, Seoul (KR); Sooyong Park, Seoul (KR); Beom Seok Chae, Seoul (KR); Hyengcheul Choi, Seoul (KR); Seong Hun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 16/707,207

(22) Filed: Dec. 9, 2019

(65) Prior Publication Data
US 2020/0212720 A1    Jul. 2, 2020

(30) Foreign Application Priority Data
Dec. 28, 2018 (KR) .................. 10-2018-0172179

(51) Int. Cl.
| H02J 7/00 | (2006.01) |
| H02J 50/40 | (2016.01) |
| H01F 38/14 | (2006.01) |
| H02J 7/02 | (2016.01) |

(52) U.S. Cl.
CPC ............ *H02J 50/402* (2020.01); *H01F 38/14* (2013.01); *H02J 7/02* (2013.01)

(58) Field of Classification Search
None
See application file for complete search history.

(56) References Cited

U.S. PATENT DOCUMENTS

| 2013/0069586 | A1 | 3/2013 | Jung et al. |
| 2014/0285140 | A1 | 9/2014 | Jung |
| 2016/0020639 | A1 | 1/2016 | Pudipeddi et al. |
| 2017/0178804 | A1 | 6/2017 | Leem |
| 2018/0091000 | A1* | 3/2018 | Jol .................. H02J 50/70 |
| 2018/0254142 | A1 | 9/2018 | Jeong et al. |

FOREIGN PATENT DOCUMENTS

| JP | 2013-70606 A | 4/2013 |
| JP | 2014-183740 A | 9/2014 |

* cited by examiner

*Primary Examiner* — Arun C Williams
(74) *Attorney, Agent, or Firm* — Birch, Stewart, Kolasch & Birch, LLP

(57) ABSTRACT

Provided are a wireless charging apparatus in which multiple coils overlaps with one another on separated cores, and a wireless charging system including such wireless charging apparatus. According to an embodiment of the present disclosure, the wireless charging apparatus includes a plurality of plate coils spaced apart from one another, a first coil disposed on the plurality plate coils, and a second coil disposed on the first coil to partially overlap with the first coil.

20 Claims, 16 Drawing Sheets

WIRELESS CHARGING APPARATUS USING MULTIPLE COILS AND WIRELESS CHARGING SYSTEM COMPRISING THE SAME

CROSS-REFERENCE TO RELATED APPLICATION

This application claims priority to and the benefit of Korean Patent Application No. 10-2018-0172179, filed on Dec. 28, 2018, the disclosure of which is incorporated herein by reference in its entirety.

BACKGROUND

1. Field of the Invention

The present disclosure relates to a wireless charging apparatus in which multiple coils overlaps with one another on separated cores, and a wireless charging system including such wireless charging apparatus.

2. Description of Related Art

In general, batteries can receive power from external chargers and can store the power, and can supply the stored power as a power source to operate electronic apparatuses.

An example method of charging the battery can include a method of supplying a terminal to receive commercial power and convert the commercial power into voltage and a current suitable for the battery, and supply the power to the battery using charging terminals.

However, the method of supplying the terminal can cause problems such as an instantaneous discharge, a spark, and a fire due to a potential difference between a charging terminal of the battery and a power supply terminal of the commercial power source. Accordingly, a wireless charging method using wireless power transmission has been proposed.

The wireless charging method can be performed by a non-contact power transmitting device and a non-contact power receiving device, and the power is transmitted from the non-contact power transmitting device to the non-contact power receiving device through electromagnetic induction between the two apparatuses.

However, through this wireless charging method, a non-contact power transmitting device can supply power only to a single non-contact power receiving device, and the non-contact power receiving device can be placed at a specific position of the non-contact power transmitting device for magnetic coupling between the two devices, and the wireless charging method corresponds to examples of the non-contact method, but a chargeable physical range is very narrow.

In order to solve the latter problem, according to the prior art document (Korean Patent No. 10-0976163), a technique for extending a chargeable range has been proposed.

According to the prior art document, to supply power stably even when the non-contact power receiving device is provided in the non-contact power transmitting device and partially moves in the non-contact power transmitting device, a primary-side core provided on the non-contact power transmitting device may include two types of cores and the non-contact power transmitting device may have a multi-layer structure in which two cores partially overlap with each other.

According to the above-described prior art document, magnetic field interference may occur due to overlapping cores and one non-contact power transmitting device may not supply the power to a plurality of non-contact power receiving devices, simultaneously.

SUMMARY OF THE INVENTION

The present disclosure provides a wireless charging apparatus that performs wireless charging using separate cores.

The present disclosure further provides a wireless charging apparatus in which multiple coils are disposed on a separated core.

The present disclosure also provides a wireless charging system that performs wireless charging using electromagnetic induction between any one of a plurality of transmitting coils in a wireless charging apparatus and a receiving coil in a battery apparatus.

Further, the present disclosure also provides a wireless charging system capable of performing multiple wireless charging based on the number of cores in the wireless charging apparatus.

The objects of the present disclosure are not limited to the above-mentioned objects, and other objects and advantages of the present disclosure which are not mentioned can be understood by the following description and more clearly understood based on the embodiments of the present disclosure. It will also be readily understood that the objects and the advantages of the present disclosure can be implemented by features defined in claims and a combination thereof.

According to the present disclosure, the wireless charging apparatus can include a plurality of plate coils spaced apart from one another to perform wireless charging using the separated cores.

Further, according to the present disclosure, the wireless charging apparatus can include a first coil disposed on the plurality of plate cores, and a second coil disposed on the first coil to partially overlap with the first coil, thereby overlapping multiple coils above the separated cores.

Further, according to the present disclosure, a wireless charging system can supply power, to a receiving coil, from a transmitting coil closest to a receiving coil of the battery apparatus, among the plurality of transmitting coils disposed on each of plate cores, thereby performing the wireless charging through electromagnetic induction between any one of the plurality of transmitting coils in the wireless charging apparatus and the receiving coil in the battery apparatus.

Further, according to the present disclosure, the wireless charging system can supply, when the plurality of battery apparatus are placed above the plurality of plate coils, respectively, the power to battery apparatuses from the transmitting coils disposed on the plate coils, thereby performing wireless multi-charging based on the number of cores in the wireless charging apparatus.

According to the present disclosure, the wireless charging apparatus can perform the wireless charging using the separated cores, thereby preventing magnetic field generated by any one core from interfering with another core.

Further, according to the present disclosure, the multiple coils can overlap with one another above the separated cores, thereby transmitting the wireless power over a wide rage through the electromagnetic induction.

Further, according to the present disclosure, the wireless charging apparatus can perform the wireless charging through the electromagnetic induction between any one of a plurality of transmitting coils in the wireless charging apparatus and a receiving coil in the battery apparatus, thereby reducing power consumption in the wireless charging apparatus and improving concentration to transmit the power.

Further, according to the present disclosure, the wireless charging system can perform N:N multiple wireless charging based on the number of cores in the wireless charging apparatus.

Hereafter, a specific effect of the present disclosure, further to the above-mentioned effect, is described together while describing a specific matter for implementing the present disclosure.

DETAILED DESCRIPTION OF EXEMPLARY IMPLEMENTATIONS

Figure 1:
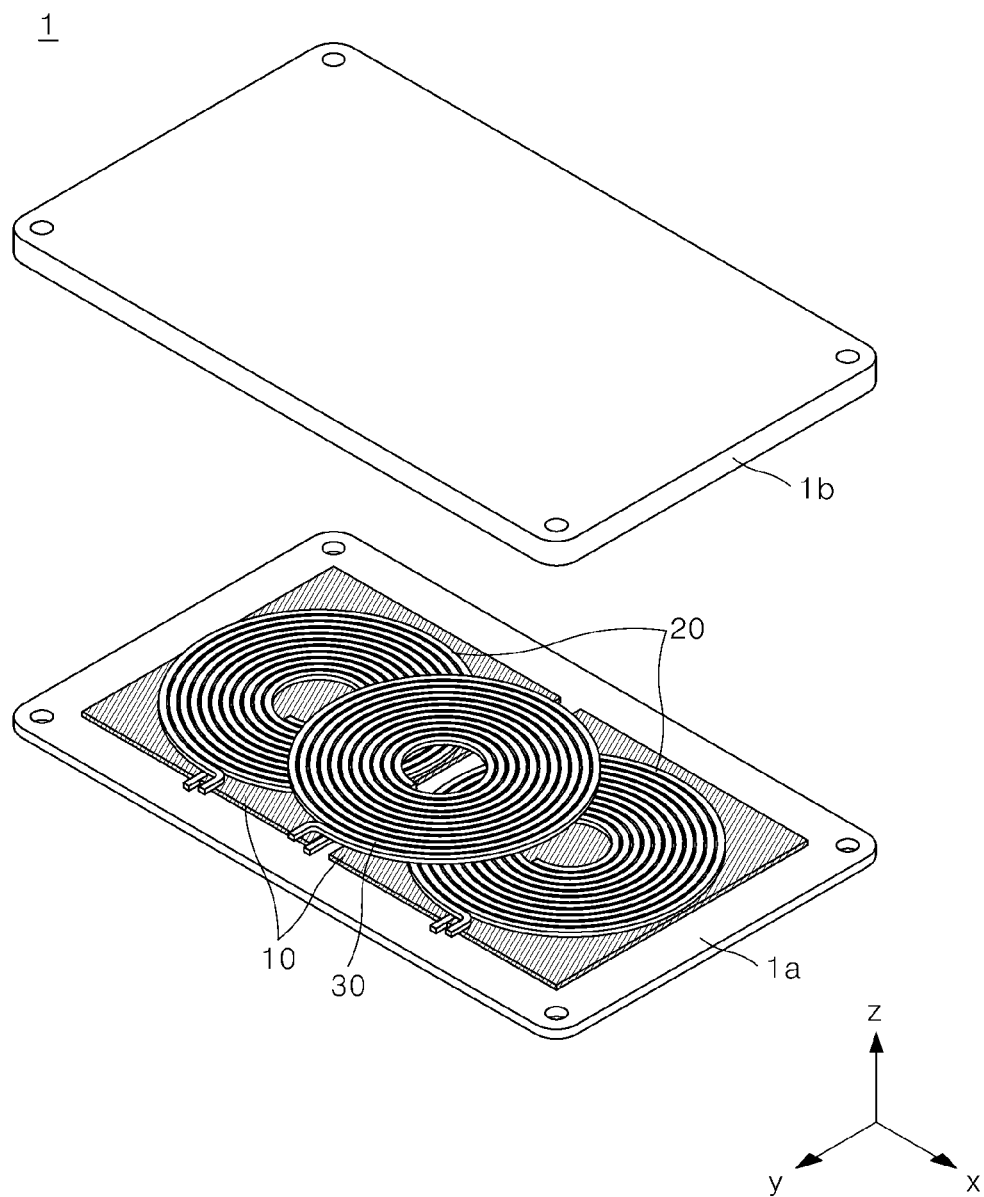
FIG. 1 is a perspective view showing a wireless charging apparatus according to an embodiment of the present disclosure.

The above mentioned objects, features, and advantages of the present disclosure will be described in detail with reference to the accompanying drawings, so that those skilled in the art to which the present disclosure pertains can easily implement the technical idea of the present disclosure. In the description of the present disclosure, when it is determined that the detailed description of the known technology related to the present disclosure can obscure the gist of the present disclosure, the detailed description thereof will be omitted. Hereinafter, preferred embodiments of the present disclosure will be described in detail with reference to the accompanying drawings. The same reference numeral is used to indicate the same or similar component in the figures.

It will be understood that, although the terms "first", "second", and the like can be used herein to describe various components, however, these components should not be limited by these terms. These terms are only used to distinguish one component from another component. Thus, a first component can be a second component unless otherwise stated.

Hereinafter, when any component is arranged in "an upper portion (or a lower portion)" of the component or "on (or under")" of the component, any component can be arranged in contact with an upper surface (or a lower surface) of the component, and another component can be interposed between the component and any component arranged on (or under) the component.

When a component is described as being "connected", "coupled", or "connected" to another component, the component can be directly connected or able to be connected to the other component; however, it is also to be understood that an additional component can be "interposed" between the two components, or the two components can be "connected", "coupled" or "connected" through an additional component.

Unless otherwise stated, each component can be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or can include additional components or steps.

Unless otherwise stated, "A to B" means "A or more and B or less"

The present disclosure relates to a wireless charging apparatus that performs wireless charging by overlapping a plurality of multiple coils above separate cores, and a wireless charging system including such wireless charging apparatus.

First, referring to FIGS. 1 to 11, a wireless charging apparatus according to an embodiment of the present disclosure is described in detail.

FIG. 1 is a perspective view of a wireless charging apparatus according to an embodiment of the present disclosure.

Referring to FIG. 1, a wireless charging apparatus 1 can have a structure in which a substrate 1*a* including a plurality of plate cores 10 and coils is coupled to a case 1*b* to seal an inside of the wireless charging apparatus 1. A control circuit can be mounted on the substrate 1*a* to supply a current the plurality of coils based on external power and examples of circuits can include a printed circuit board (PCB), an integrated circuit (IC), and the like.

The plate core 10 can be made of material having high permeability and not easily broken. More specifically, the plate core 10 can be made of amorphous metal such as cobalt (Co), iron (Fe), nickel (Ni), boron (B), silicon (Si), or a combination thereof, and can have a sheet form or a thin film form. For example, according to the present disclosure, the plate core 10 can be a ferrite core.

Accordingly, the plate core 10 can increase the magnetic flux density of the magnetic field generated by the coil described below and can efficiently define a magnetic path of the magnetic field.

The plate core 10 can be provided in plural and the plurality of plate cores 10 can be provided on the substrate 1a and can be spaced apart from one another. More specifically, the plurality of plate cores 10 can be provided on the substrate 1a and can be spaced apart by a predetermined distance d in a planar direction (in an x-axis direction or a y-axis direction).

Now the coil described below is a plate coil provided above the plate core 10 and can be wound clockwise or counterclockwise. Such coils can have a circular shape, an oval shape, or a square shape. Connecting terminals can be provided at both ends of the coil to electrically connect to the above-mentioned control circuit. Accordingly, the control circuit can apply a current to coils through the connecting terminal to generate the magnetic field.

The coil can be divided into a first coil 20 and a second coil 30 according to the arrangement of coils. More specifically, the first coil 20 can be disposed on the plate core 10 and the second coil 30 can be disposed on another coil.

Figure 2:
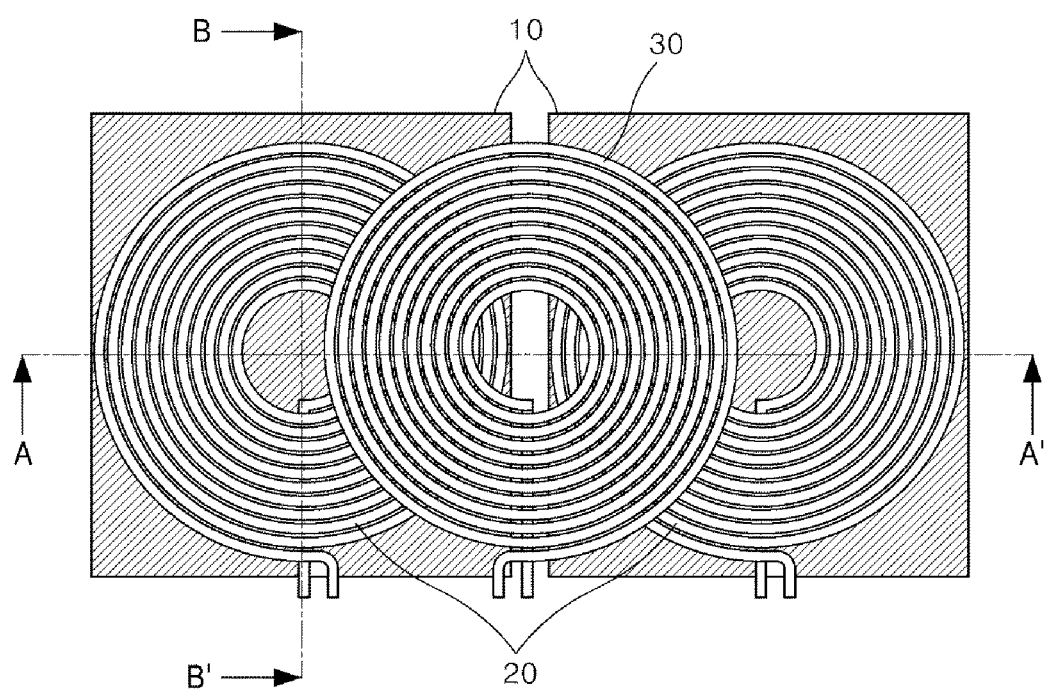
FIG. 2 is a top view separately showing plate coils shown in FIG. 1 and coils disposed above the plate coils.
Figure 3:
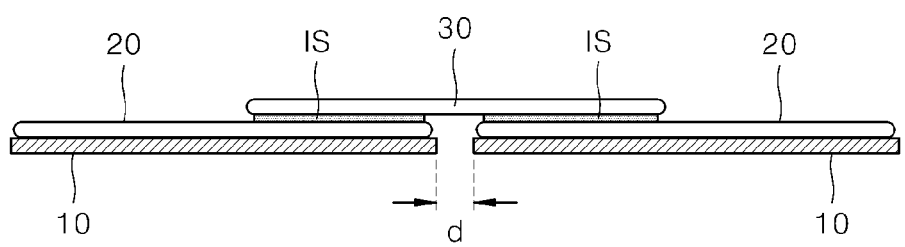
FIG. 3 is a side view taken along line A-A' shown in FIG. 2, viewed in a direction of arrow.
Figure 4:
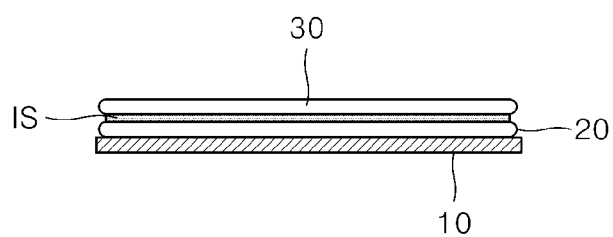
FIG. 4 is a side view taken along line B-B' shown in FIG. 2, viewed in a direction of arrow.

FIG. 2 is a top view separately showing the plate coils and the coils disposed above the plate coils shown in FIG. 1. Further, FIG. 3 is a side view taken along line A-A' shown in FIG. 2, viewed from a direction of arrow. FIG. 4 is a side view taken along line B-B' shown in FIG. 2, viewed from a direction of arrow.

Referring to FIGS. 1 to 4, the first coil 20 can be disposed on the plurality of plate cores 10. More specifically, some or all of the first coils 20 can be disposed on the plate core 10 and can contact the plate cores 10.

For example, the first coil 20 can include a plurality of coils spaced apart from one another and the plurality of coils can be disposed on the plurality of plate cores 10. For example, as shown in FIGS. 1 to 3, the first coil 20 can include two coils and the two coils can be spaced apart from each other on the two plate cores 10.

For example, as shown in FIGS. 1 to 3, the plurality of first coils 20 can be provided in areas formed by the plate cores 10, respectively, and can be disposed on plate cores 10, respectively, and can be spaced apart from one another. In other words, a width of the first coil 20 can be less than a width of the plate core 10, and the first coil 20 can be disposed in an area formed by the plate core 10 viewed from the top.

Meanwhile, the second coil 30 can be disposed on the first coil 20 to partially overlap with one or more of the first coils 20. More specifically, a portion of the second coil 30 can contact the first coil 20 and can be disposed on the first coil 20.

For example, the second coil 30 can be disposed on the first coil 20 to partially overlap with all of the plurality of first coils 20 disposed on the plate cores 10. In other words, as shown in FIGS. 1 to 3, the second coil 30 can partially overlap with the first coil 20 disposed on the plate core 10 provided at one side thereof, and at the same time can partially overlap with the first coil 20 disposed on the plate core 10 provided at the other (or another) side thereof.

Meanwhile, an insulating sheet IS can be provided on the first coil 20 and can be provided at an area in which the first coil 20 overlaps with the second coil 30. In other words, an upper surface of the first coil 20 can contact a lower surface of the insulating sheet IS and a lower surface of the second coil 30 can contact an upper surface of the insulating sheet IS.

Referring to FIGS. 3 and 4, the insulating sheet IS can be provided on the first coil 20 to insulate the first coil 20 and the second coil 30 from each other. The insulating sheet IS can be provided on the first coil 20, and can be selectively provided only in an area in which the first coil 20 and the second coil 30 overlap with each other, as shown in the figures.

Preferably in all examples and embodiments of the present disclosure (but variations may be possible), each coil is insulated (e.g., via the insulating sheet(s) IS), so that insulating performance can be maintained even when any coil contacts (or is disposed adjacent) another coil. Even when current leakage occurs due to external damage of the coil, an upper surface of any coil can contact the lower surface of the insulating sheet IS and a lower surface of another coil can contact the upper surface of the insulating sheet IS, thereby providing insulation between coils.

Figure 5:
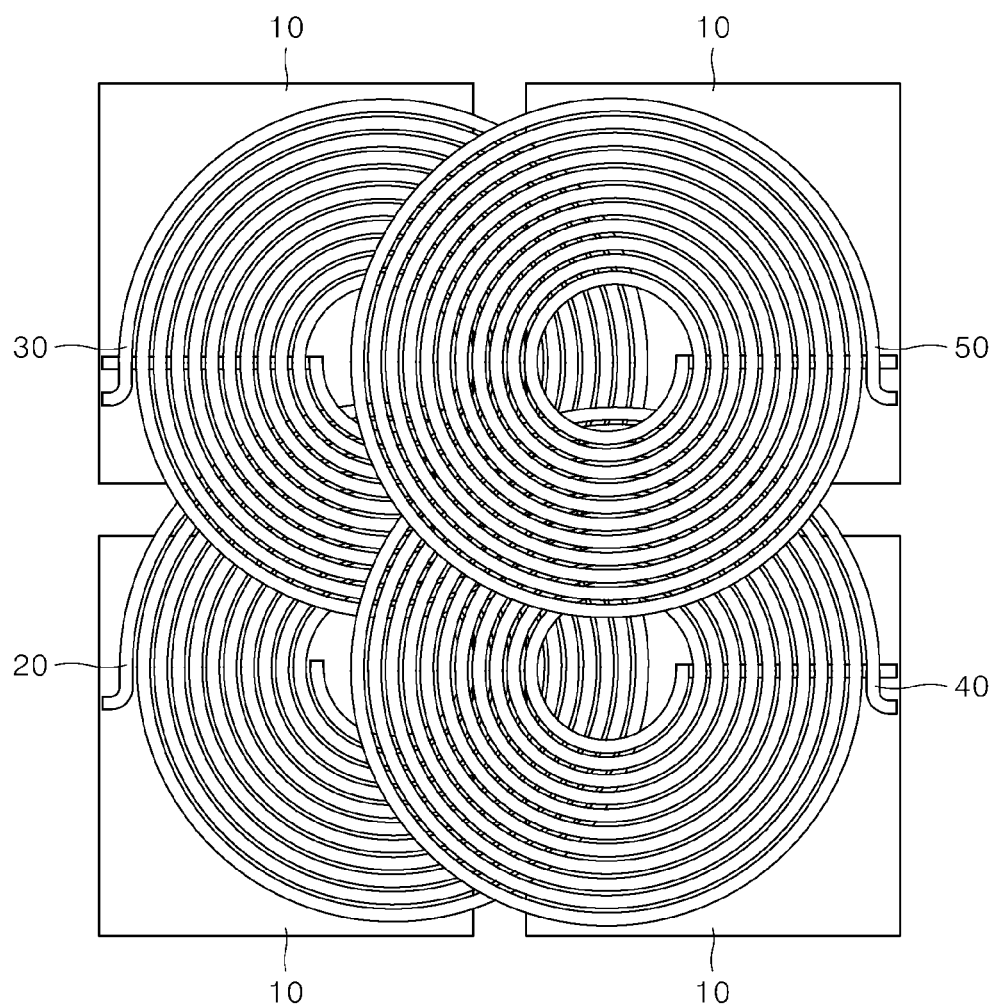
FIGS. 5 and 6 are top views showing other respective example coils disposed above plate cores having a matrix shape and spaced apart from one another according to an embodiment of the present disclosure.
Figure 6:
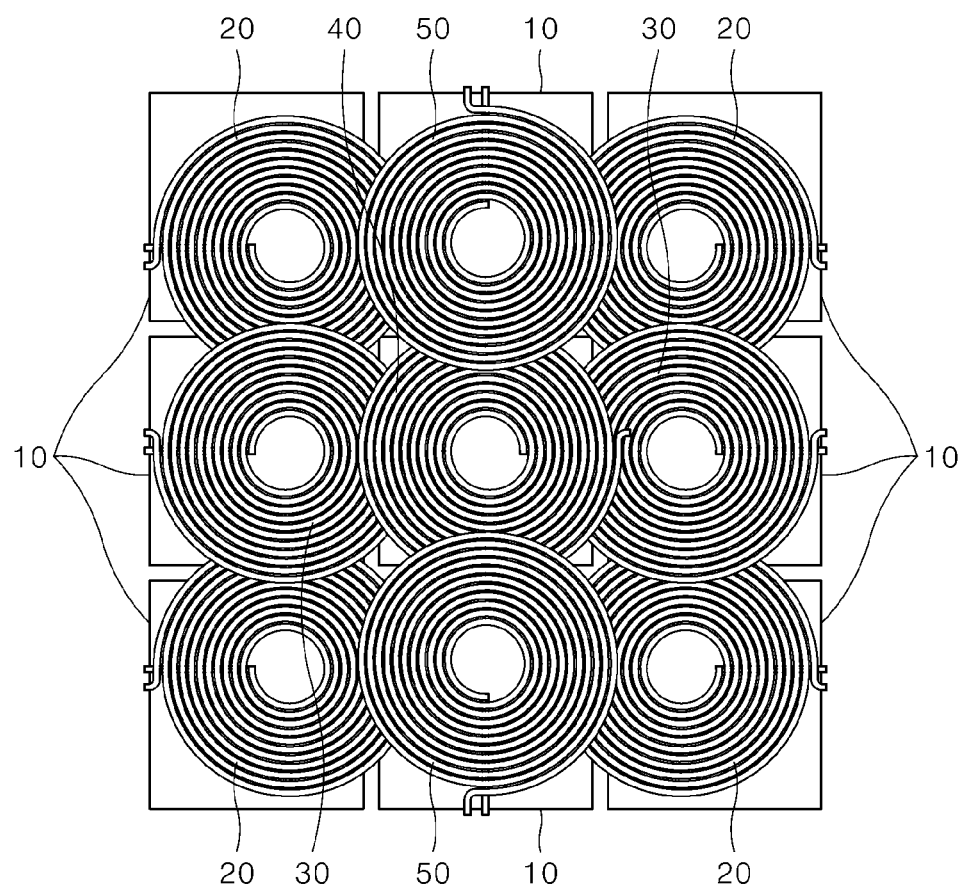

FIGS. 5 and 6 are top views showing other examples of coils disposed above plate cores spaced apart from one another and having matrix shapes according to an embodiment of the present disclosure.

As mentioned above, a second coil 30 can be disposed on another coil. However, hereinafter, for convenience of description, the second coil 30 can be disposed on the first coil 20 and a third coil 40 can be disposed on the second coil 30, and a fourth coil 50 can be disposed on the third coil 40.

Referring to FIGS. 5 and 6, the plurality of plate core 10 can be spaced apart from one another and can have a matrix shape. In other words, the plurality of plate cores 10 can be spaced apart from one another and can have a rectangular lattice shape or a square lattice shape or another shape. In this case, a separation distance d between the plate cores 10 in the x-axis can be the same as in the y-axis or can be different.

The total number of coils disposed above the plate core 10 can be the same as the number of the plate cores 10. For example, as shown in FIG. 5, when four plate cores 10 are spaced apart from one another and have a square matrix shape, the total four coils can be arranged above the plate cores 10. As shown in FIG. 6, when nine plate cores 10 are spaced apart from one another and have a square matrix shape, total nine coils can be disposed above the plate cores 10.

Meanwhile, the first coil 20 can be disposed on the plate core 10 to partially overlap with the area formed by plate core 10.

For example, referring to FIG. 5, the first coil 20 can directly contact the plate core 10 and can be placed at a lower left end of FIG. 5. In this case, the first coil 20 can be placed on the plate core 10 to partially overlap with the area formed by the plate core 10 provided at the lower left end of FIG. 5. In other words, viewed from the top, an area of the first coil 20 can be greater than the area of the plate core 10 provided at the lower left end of FIG. 5. A width of the first coil 20 is not limited thereto, but can be greater than the width of the plate core 10 to easily overlap with the second coil 30.

The second coil 30 can be disposed on the first coil 20 to partially overlap with the first coil 20 above the plate core 10 provided at an upper left end thereof. Further, the third coil 40 can be disposed on the second coil 30 to partially overlap with the second coil 30 above the plate core 10 provided at a lower right end of FIG. 5. Finally, the fourth coil 50 can be disposed on the third coil 40 to partially overlap with the third coil 40 provided above the plate core 10 at the upper right end of FIG. 5.

In FIG. 6, positions of square plate cores 10 and coils disposed above the plate cores 10 are represented by coordinates. For example, the plate cores 10 arranged in row 1 and column 3 are represented by a [1,3] plate core, and the coil arranged in row 2 and column 2 is represented by a [2,2] coil.

Similar to FIG. 5, each coil shown in FIG. 6 can be disposed above the plate core 10 to partially overlap with an area formed by each plate core 10. In FIG. 6, the first coils 20 can directly contact the plate cores 10 and can include [1,1], [1,3], [3,1], and [3,3] coils.

The second coils 30 can be disposed on the first coils 20 and can be [2,1] and [2,3] coils. The second coil 30 can be disposed on the first coil 20 to partially overlap with the first coil 20 above the plate core 10. More specifically, the [2,1] coil can partially overlap with the [1,1] coil and [3,1] coil of the first coils 20, and the [2,3] coil can partially overlap with the [1,3] coil and the [3,3] coil, of the first coils 20.

The third coil 40 can be disposed on the second coil 30 and can be a [2,2] coil. The third coil 40 can be disposed on the second coil 30 to partially overlap with the second coil 30 provided above the plate core 10. More specifically, the [2,2] coil can partially overlap with the [2,1] and [2,3] coils provided as examples of the second coil 30.

The fourth coils 50 can be disposed on the third coil 40 and can include a [1,2] coil and a [3,2] coil. The fourth coil 50 can be disposed on the third coil 40 to partially overlap with the third coil 40 provided above the plate core 10. More specifically, the [1,2] coil and the [3,2] coil can be disposed on the fourth coil 50 to partially overlap with the [2,2] coil, which is the third coil 40, respectively.

Figure 7:
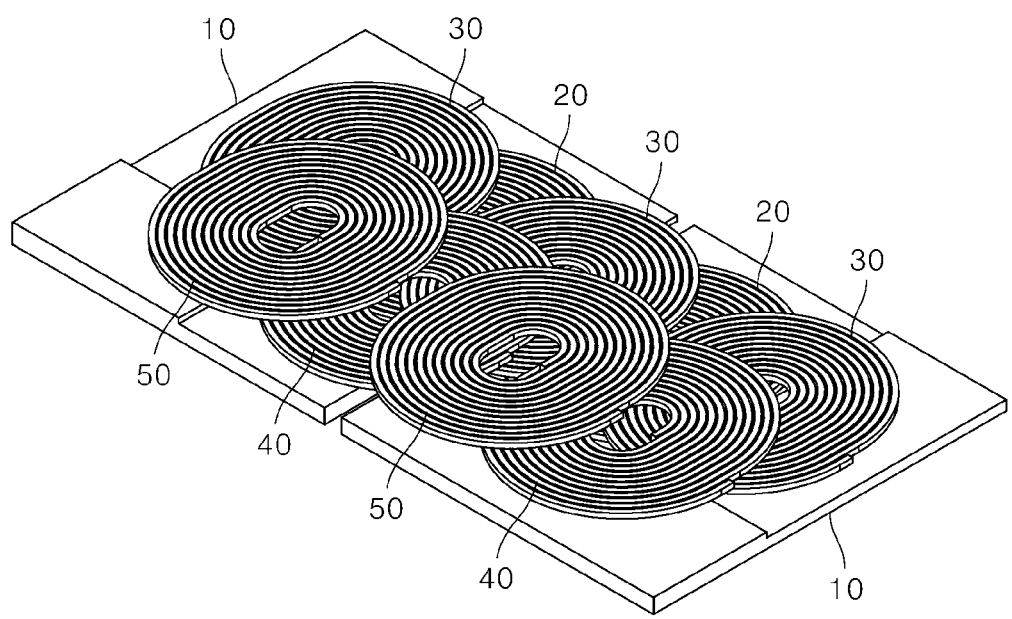
FIG. 7 is a perspective view showing a wireless charging apparatus including nine coils according to another example of the present disclosure.
Figure 8:
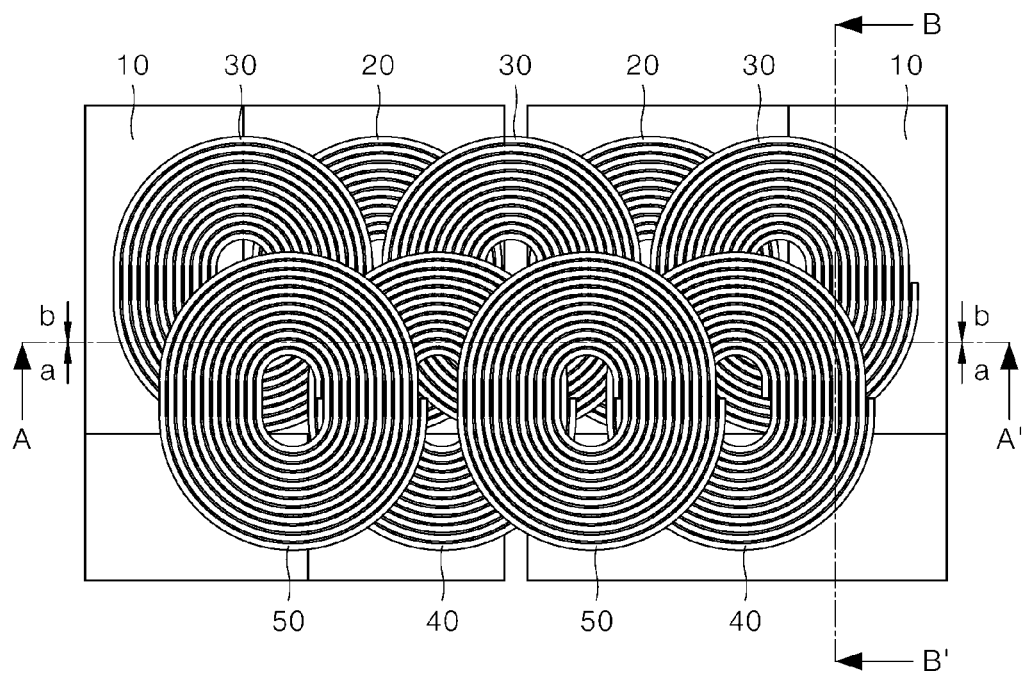
FIG. 8 is a top view separately showing plate cores shown in FIG. 7 and coils disposed above the plate cores.

FIG. 7 is a perspective view showing a wireless charging apparatus including nine coils according to another example of the present disclosure. FIG. 8 is a top view separately showing flat plate coils shown in FIG. 7 and coils disposed above plate coils.

Figure 9:
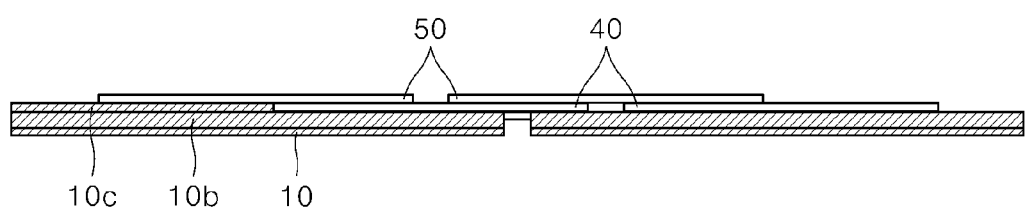
FIG. 9 is a side view taken along line A-A' shown in FIG. 8, viewed from a direction of arrow 'a'.
Figure 10:
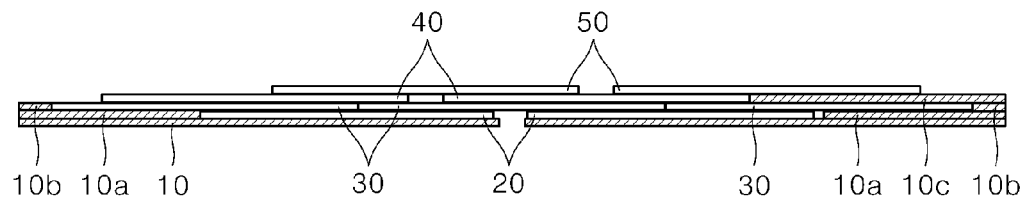
FIG. 10 is a side view taken along line A-A' shown in FIG. 8, viewed from a direction of arrow 'b'.
Figure 11:
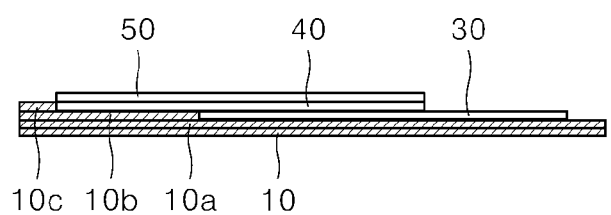
FIG. 11 is a side view taken along line B-B' shown in FIG. 8, viewed form a direction of an arrow.

Further, FIG. 9 is a side view taken along line A-A' shown in FIG. 8, viewed from a direction of arrow 'a'. FIG. 10 is a side view taken along line A-A' shown in FIG. 8, viewed from a direction of arrow 'b'. FIG. 11 is a side view taken along line B-B' shown in FIG. 8, viewed from a direction of arrow.

The total number of coils disposed above an area formed by each plate core 10 can be plural. More specifically, a plurality of first coils 20 can be disposed or the plurality of second coils 30 can be disposed, and at least one first coil 20 and at least one second coil 30 can be disposed, in the area formed by the plate area 10.

Referring to FIG. 7, a total of nine coils can be disposed above two plate cores 10 spaced apart from each other. Two first coils 20 can be disposed on plate cores 10 in areas formed by plate cores 10, respectively. The three second coils 30 can be disposed on the first coils 20 to partially overlap with the first coils 20.

Specifically, referring to FIG. 8, the second coil 30 provided at the left side, among the three second coils 30, can be disposed on the first coil 20 to partially overlap with the first coil 20 provided at the left side, and the second coil 30 provided at the center can be disposed above the first coil 20 to overlap with the two first coils 20, and a second coil 30 provided at the right side can be disposed on the first coil 20 to partially overlap with the first coil 20 at the right side.

Further, the two third coils 40 can be disposed above the second coils 30 to partially overlap with the second coils 30. More specifically, the third coil 40 on the left side of the two third coils 40 can be disposed on the second coil 30 to partially overlap with the second coil 30 provided at the left side and the center, and the third coil 40 provided at the right side can be disposed on the second coil 30 to partially overlap with the second coil 30 provided at the center and the second coil 30 provided at the right side.

Finally, two fourth coils 50 can be disposed on the third coil 40 to partially overlap with the third coil 40. More specifically, the fourth coil 50 provided on the left side of the two fourth coils 50 can be disposed on the third coil 40 to partially overlap with the third coil 40 provided at the left side and the four coil 50 provided at the right side can be disposed on the third coils 40 to partially overlap with the third coil 40 at the left side and the third coil 40 provided at the right side.

As described above, the second coil 30 can be disposed on the first coil 20, the third coil 40 can be disposed on the second coil 30, and the fourth coil 50 can be disposed on the third coil 40. The first coil to the fourth coil 50 can be provided above the plate core 10 and a height of the first coil can be different from a height of the fourth coil 50.

In order to prevent the above matter, a height compensating core can be disposed above the plurality of plate cores 10 to compensate for a height difference between coils. Any height compensating core can be disposed above the plate core 10 can be disposed above other height compensating cores.

Referring to FIGS. 7 and 9 to 11, a first height compensating core 10a can be provided at both sides (an x-axis direction) of the first coil 20 provided on the plate core 10 to compensate for the height difference between the first coil 20 and the second coil 30. Further, a second height compensating core 10b can be provided on one side of an upper portion or a lower portion (a y-axis direction) of the second coil 30 provided above the first height compensating core 10a to compensate for the height difference between the second coil 30 and the third coil 40. Further, a third height compensating core 10c can be provided on a side surface (an x-axis direction) of the third coil 40 provided on the second height compensating core 10b to compensate for the height difference between the third coil 40 and the fourth coil 50.

Accordingly, as shown in FIG. 11, the first height compensating core 10a can be provided on the upper surface of the plate core 10, and the second height compensating core 10b can be provided on the upper surface of the first height compensating core 10a. The third height compensating core 10c can be provided on an upper surface of the second height compensating core 10b.

As described above, the height compensating core can be provided between the two coils to compensate for the height difference between the coils, so that each coil has an equivalent level of inductance regardless of position of each coil.

The above-mentioned wireless charging apparatus 1 can be used to charge any apparatus including a battery through electromagnetic induction.

A wireless charging system including the wireless charging apparatus 1 is described in detail with reference to FIGS. 12 to 14.

Figure 12:
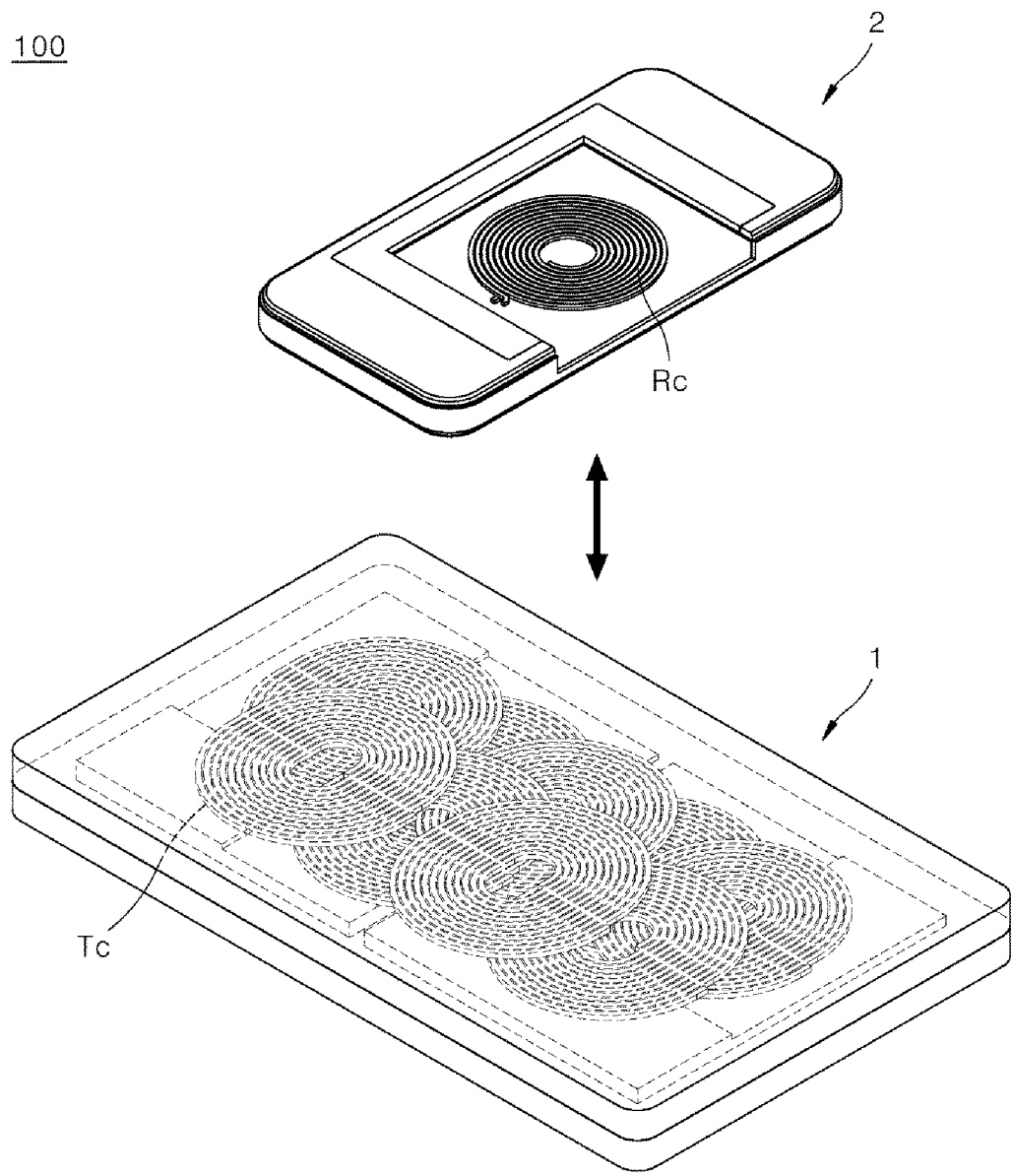
FIG. 12 illustrates a wireless charging system including the wireless charging apparatus and a battery apparatus shown in FIG. 7.

FIG. 12 shows a wireless charging system including a wireless charging apparatus and a battery apparatus shown in FIG. 7. FIG. 13 shows a control flow of the wireless charging system shown in FIG. 12.

Figure 14:
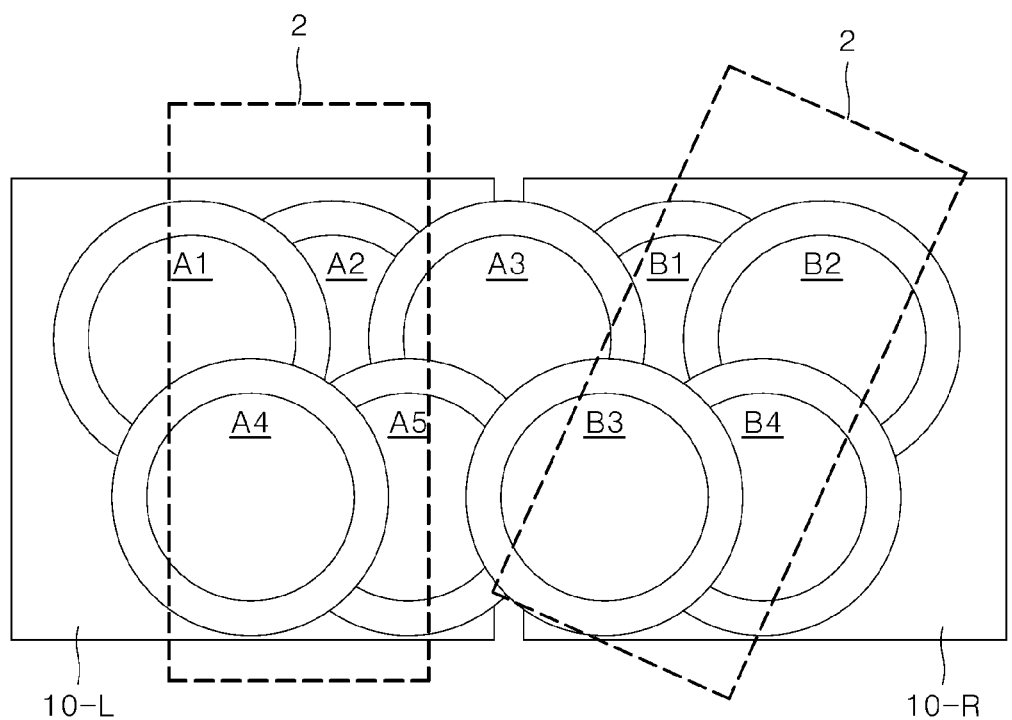
FIG. 14 shows a method of supplying, when one or more battery apparatuses are placed above a wireless charging apparatus, charging power to each of battery apparatuses according to an embodiment of the present disclosure.

FIG. 14 shows a method of supplying charging power to each battery apparatus when one or more battery apparatuses are placed above the wireless charging apparatus.

Referring to FIG. 12, according to an embodiment of the present disclosure, a wireless charging system 100 can include a wireless charging apparatus 1 and a battery apparatus 2. In one embodiment, the wireless charging system 100 shown in FIG. 12 can be provided, and components of the wireless charging system 100 are not limited to the embodiment shown in FIG. 12, and some components can be added, changed, or deleted as necessary.

The wireless charging apparatus 1 can be connected to the external power Vs and can include a plurality of plate coils spaced apart from one another and a plurality of transmitting coils Tcs that overlap with one another above the plurality of plate coils.

The wireless charging apparatus 1 can be any wireless charging apparatus 1 described above with reference to FIGS. 1 to 11. However, hereinafter, it is assumed that the wireless charging apparatus 1 included in the wireless charging system 100 has the structure shown in FIG. 7.

The wireless charging apparatus 1 can be connected to an external power source Vs to receive driving power. The external power source Vs can include any voltage source to supply voltage. For example, the external power source Vs can be a commercial power source used at home. Accordingly, the wireless charging apparatus 1 can further include a separate cable to connect with the external power source Vs.

The battery apparatus 2 includes a receiving coil Rc and receives charging power from the wireless charging apparatus 1 through electromagnetic induction between at least one of the plurality of transmitting coils Tcs and the receiving coil Rc, to charge the internal battery 22.

The battery apparatus 2 can be any apparatus including the battery 22, the receiving coil Rc, and an MCU (Micro-Controller Unit) 21 that controls the battery 22 and the receiving coil Rc and can be a mobile apparatus, for example, smart phones, and tablets.

Referring to FIG. 12, the electromagnetic induction phenomenon is briefly described. The battery apparatus 2 can be placed above the wireless charging apparatus 1 or can be close to the wireless charging apparatus 1, so that a distance between the receiving coil Rc in the battery apparatus 2 and the transmitting coil Tc of the wireless charging apparatus 1 can be less than a predetermined distance.

In this case, magnetic coupling can occur between the transmitting coil Tc and the receiving coil Rc. More specifically, when current flows through the transmitting coil Tc, magnetic field can be generated in the transmitting coil Tc, a current can be induced into the receiving coil Rc through the magnetic field, and the induced current can charge the battery 22.

Figure 13:
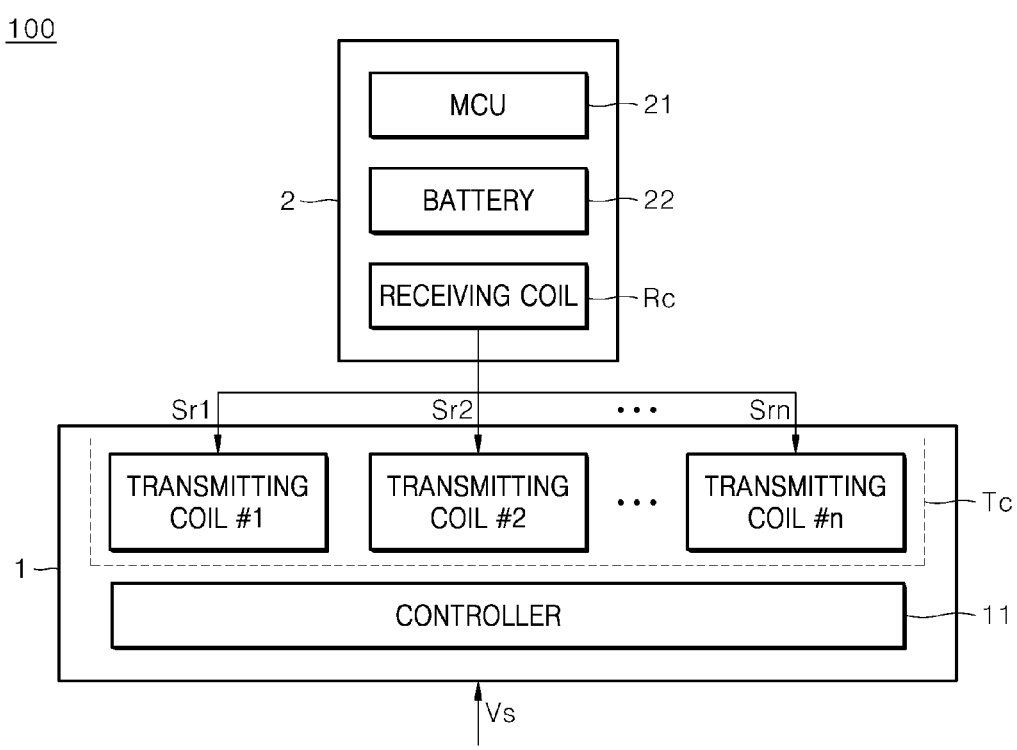
FIG. 13 shows a control flow of the wireless charging system shown in FIG. 12.

As shown in FIG. 13, the battery apparatus 2 can include an MCU 21, a battery 22, and a receiving coil Rc. The battery 22 can be electrically connected to the receiving coil Rc and can be charged based on the current induced into the receiving coil Rc. In this case, the MCU 21 can control a power conversion apparatus such as a converter to convert the induced current into a voltage required by the battery 22.

Meanwhile, the wireless charging apparatus 1 can include a plurality of transmitting coils Tcs and a controller 11 that selectively applies a current to each of the transmitting coils Tc. The controller 11 can be mounted on the substrate 1a shown in FIG. 1, and can include a printed circuit board (PCB) and an integrated circuit (IC) that converts an external power source Vs and controls a transmitting coil Tc.

The battery apparatus 2 can receive the charging power from at least one of the plurality of transmitting coils Tcs to charge the internal battery 22. In other words, the wireless charging apparatus 1 can selectively apply the current to some or all transmitting coils Tcs of the plurality of transmitting coils Tc to supply the charging power to the battery apparatus 2.

For example, referring to FIG. 14, the wireless charging apparatus 1 can apply the current to all nine transmitting coils Tcs to supply the charging power regardless of position of the battery apparatus 2 placed thereabove, and can apply the current to five coils placed in a first row to supply the charging power, and can apply the current to four coils placed in a second row to supply the charging power.

Meanwhile, the battery apparatus 2 can receive the charging power through any one group of transmitting coils in which the plurality of transmitting coils Tcs are grouped based on the position of the plate core In other words, the wireless charging apparatus 1 can selectively apply the current to the transmitting coils Tcs belonging to any one group of transmitting coils, among a plurality of transmitting coils Tcs, to supply the charging power to the battery apparatus 2.

The group of transmitting coils can include at least one transmitting coil Tc and can be classified according to positions of plate cores. As shown in FIG. 14, the group of transmitting coils can be divided into A group of transmitting coils and B group of transmitting coils according to positions of plate cores. More specifically, A group of transmitting coils can include transmitting coil A1 (Tc) to transmitting coil A5 (Tc) provided at a position of a left plate core 10-L, and a B group of transmitting coils can include transmitting coil B1 (Tc) to transmitting coil B4 (Tc) provided at a position of a right plate core 10-R.

When the battery apparatus 2 is placed above the left plate core 10-L, the wireless charging apparatus 1 can apply a current to the transmitting coil A1 (Tc) to the transmitting coil A5 (Tc) included in the A group of transmitting coils, thereby supplying the charging power to a battery apparatus. Further, when the battery apparatus 2 is placed above the right plate core 10-R, the wireless charging apparatus 1 can apply the current to the transmitting coil B1 (Tc) to the transmitting coil B4 (Tc) included in the B group of transmitting coils to supply the charging power to the battery apparatus.

In addition, when two battery apparatuses 2 are placed on the left plate core 10-L and the right plate core 10-R, respectively, the wireless charging apparatus 1 can apply the current to all transmitting coils Tcs included in the A group of transmitting coils and the B group of transmitting coils to supply the charging power to the battery apparatuses 2.

More specifically, the battery apparatus 2 can receive the charging power from any one group of transmitting coils including transmitting coils or any one transmitting coil Tc which is closest to the receiving coil Rc, among the plurality of transmitting coils Tcs disposed above each of plate cores.

To this end, the wireless charging apparatus 1 can detect the position of the battery apparatus 2. More specifically, the wireless charging apparatus 1 sequentially applies current to the plurality of transmitting coils Tcs for a non-overlapping period of time, and receive a response signal from the battery apparatus 2 through the receiving coil Rc into which the voltage is induced based on the current, and can detect the position of the battery apparatus 2 based on comparison of the received intensity of the response signal with a reference intensity of the response signal.

The wireless charging apparatus 1 can sequentially apply current to the plurality of transmitting coils Tcs in any order for a non-overlapping period of time. For example, in FIG. 14, the wireless charging apparatus 1 can first apply current to the transmitting coil A1 to the transmitting coil A5 sequentially, and can sequentially apply current to B1 to B4.

When the current is applied to each transmitting coil Tc, voltage (the current) can be induced into the receiving coil Rc in the battery apparatus 2 placed above the wireless charging apparatus 1 through the electromagnetic induction. The MCU 21 in the battery apparatus 2 can be driven based on the induced voltage and the MCU 21 can transmit the response signal corresponding to a magnitude of the induced voltage to the wireless charging apparatus 1 through the receiving coil Rc.

The wireless charging apparatus 1 can detect that, when the intensity of the response signal received when a current is applied to any one of the transmitting coils Tc is greater than or equal to the reference intensity, the battery apparatus 2 is placed above the plate core in which any one of transmitting coils Tcs is placed to which the current is applied.

Further, the wireless charging apparatus 1 can determine that, when the received intensity of the response signal is greatest when the current is applied to any one of transmitting coils Tcs, the transmitting coil Tc is closest to the receiving coil Rc of the battery apparatus 2.

For example, in FIG. 14, when the battery apparatus 2 is located above the plate core 10-L on the left side, the intensity of the response signal received when the current is applied to the transmitting coil A4 (Tc) is equal to or greater than the reference intensity, which is the greatest. The controller 11 of the wireless charging apparatus 1 can determine that the battery apparatus 2 is placed on the plate core 10-L at the left side, and can determine that the transmitting coil A4 (Tc) is closest to the receiving coil Rc among the plurality of transmitting coils Tcs disposed on the plate core 10-L on the left side based on the above matter.

Accordingly, the wireless charging apparatus 1 can determine, as the transmitting coil Tc to supply the charging power, the A group of transmitting coils including the transmitting coil A4 (Tc) or the transmitting coil A4 (Tc). Subsequently, the wireless charging apparatus 1 can selectively apply the current to the determined A group of transmitting coils or the transmitting coil A4 (Tc) to supply the charging power to the battery apparatus 2.

More specifically, the wireless charging apparatus 1 can apply the current to the transmitting coil A1 (Tc) to the transmitting coil A5 (Tc) included in the A group of transmitting coils and can apply the current only to the transmitting coil A4 (Tc) to supply the charging power to the battery apparatus 2.

Meanwhile, when the plurality of battery apparatuses 2 are located above the plurality of plate cores, the wireless charging apparatus 1 can supply the charging power to the plurality of battery apparatuses 2, respectively, through the plurality of transmitting coils Tcs closest to the receiving coils Rcs provided in the plurality of battery apparatuses 2, respectively, among the plurality of transmitting coils Tcs disposed above each of plate coils.

The controller 11 in the wireless charging apparatus 1 can sequentially apply the current to the transmitting coil A1 to the transmitting coil A5 and can detect that the battery apparatus 2 is placed above the left plate core 10-L based on the intensity of the response signal received from the battery apparatus 2. Further, the controller 11 can sequentially apply the current to the transmitting coil B1 to the transmitting coil B4 and can detect that the battery apparatus 2 is disposed above the right plate core 10-R based on the intensity of the response signal received from the battery apparatus 2.

As shown in FIG. 14, when two battery apparatuses 2 are located above the wireless charging apparatus 1, the controller 11 can detect that battery apparatuses 2 are placed above the left plate core 10-L and the right plate core 10-R based on the intensity of the response signal provided by the battery apparatuses 2.

Meanwhile, when the current is applied to the transmitting coil A4 (Tc) among the transmitting coil A1 (Tc) to the transmitting coil A5 (Tc), the intensity of the received response signal can be the greatest, and the intensity of the response signal received when the current is applied to the transmitting coil B2 (Tc), among the transmitting coil B1 (Tc) to the transmitting coil B4 (Tc) can be greatest.

Accordingly, the wireless charging apparatus 1 can apply the current to the transmitting coil A4 (Tc) and can supply the charging power to the battery apparatus 2 placed above the left plate core 10-L and can apply the current to the transmitting coil B2 (Tc) to supply the charging power to the battery apparatus 2 placed above the right plate core 10-R.

As described above, according to the present disclosure, multiple coils overlap with one another above separated cores, so that the wireless charging apparatus 1 can perform the wireless power transmitting through the electromagnetic induction over a wide range.

For example, even when the user may not place the battery apparatus 2 at a correct position of the wireless charging apparatus 1, the wireless charging apparatus 1 can still effectively supply the power to the battery apparatus 2 through at least one of the overlapping multiple coils of the present disclosure, and thus, the wireless charging apparatus 1 can perform the wireless charging over the wide range formed by overlapping multiple coils.

Further, according to the present disclosure, the wireless charging system 100 can perform the wireless charging through the electromagnetic induction between any one transmitting coil Tc of the plurality of transmitting coils Tcs in the wireless charging apparatus 1 and the receiving coil Rc of the battery apparatus 2, thereby reducing the power consumption of the wireless charging apparatus 1 and improving concentration to transmit the power.

In other words, according to the present disclosure, the wireless charging system 100 can transmit the power only through any one of transmitting coils Tcs which is magnetically coupled to an optimal position based on the position of the battery apparatus 2, thereby improving efficiency of power transmission, and can apply the current only to a single transmitting coil Tc among the plurality of transmitting coils Tc to reduce the power consumption.

Further, according to the present disclosure, the wireless charging system 100 can perform N:N multiple wireless charging based on the number of cores in the wireless charging apparatus 1. In other words, according to the present disclosure, the wireless charging system 100 can simultaneously wirelessly charge the battery apparatus 2, and the number of battery apparatuses 2 can correspond to the number of plate coils.

For example, as described above, when the wireless charging apparatus 1 can charge at the same or similar time two battery apparatuses 1 provided in the left plate core and the right plate core 10-R, when the wireless charging apparatus 1 has a structure as shown in FIG. 7. In addition, when the wireless charging apparatus 1 has the structure as shown in FIG. 5, a wireless charging system 100 can charge at the same or similar time four battery apparatuses corresponding to the number of plate coils. When the wireless charging apparatus 1 has the structure as shown in FIG. 6, a wireless charging system 100 can charge at the same or similar time nine battery apparatuses 2 corresponding to the number of plate coils.

Further, according to the present disclosure, the wireless charging apparatus 1 can perform the wireless charging using the separated cores, thereby preventing a magnetic field generated by any one core from interfering with another core.

Figure 15:
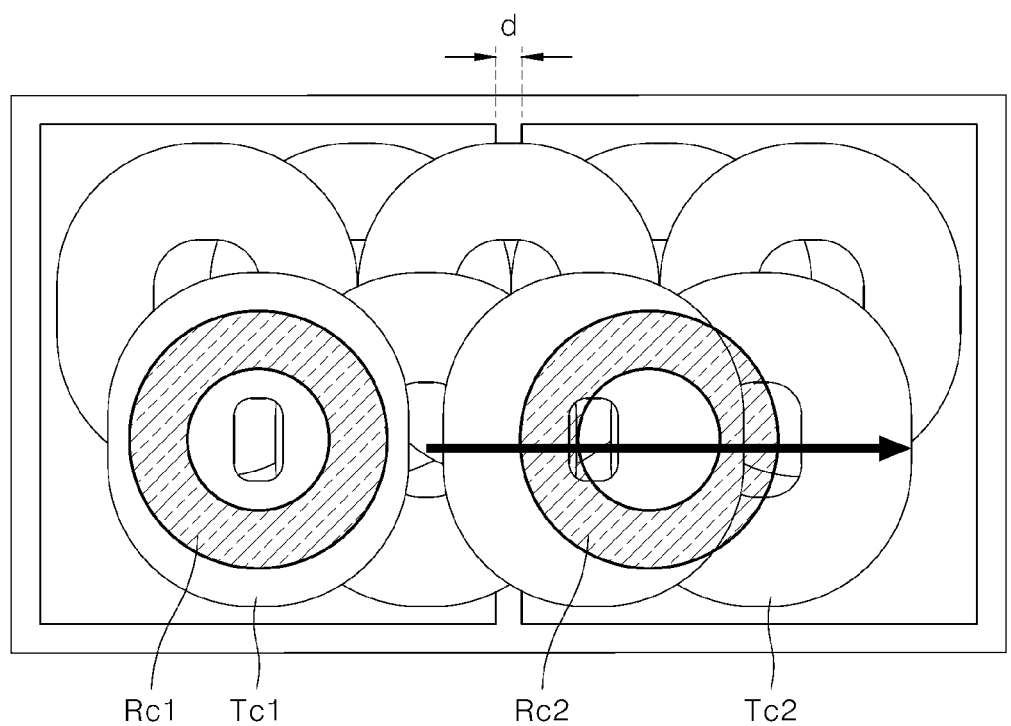
FIG. 15 shows one receiving coil moving in a direction from any one transmitting coil to another transmitting coil according to an embodiment of the present disclosure.
Figure 16:
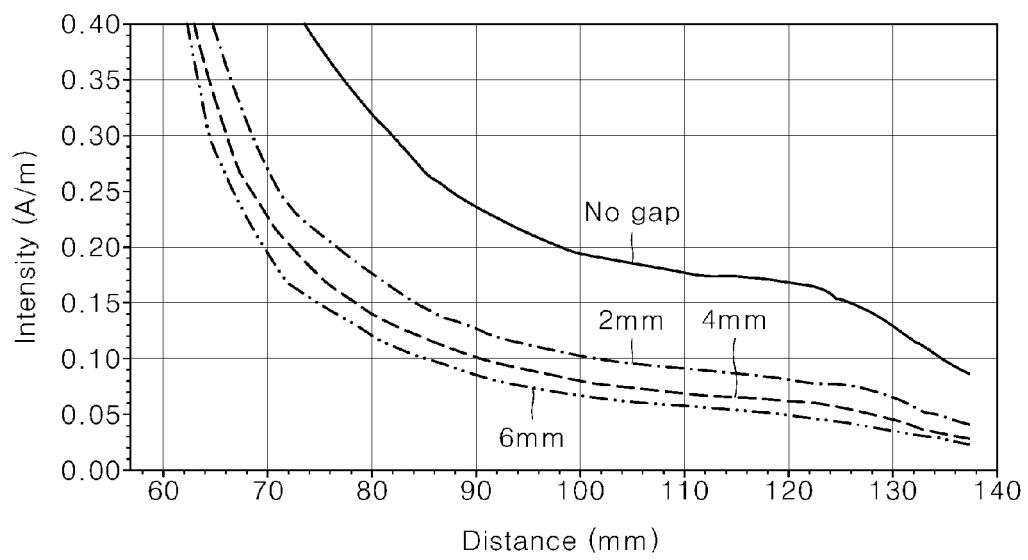
FIG. 16 is a graph showing magnitude of magnetic field induced into another transmitting coil with respect to a separation distance between two plate coils shown in FIG. 15 and a moving distance of the receiving coil.

More specifically, with reference to FIGS. 15 and 16, changes in intensity of magnetic field between coils with respect to a separation distance (d) of plate coils, in the above-mentioned wireless charging apparatus 1 and the wireless charging system 100 including the wireless charging apparatus 1 are described.

FIG. 15 shows a receiving coil moving in a direction from any one transmitting coil to another transmitting coil. FIG. 16 shows a graph corresponding to a magnitude of magnetic field induced into another transmitting coil with respect to a separation distance between plate coils and a moving distance of a receiving coil shown in FIG. 15.

As shown in FIGS. 15 and 16, a subject of simulation is a wireless charging apparatus 1 shown in FIG. 7 and parameters of simulation can include a separation distance (d) between the two plate coils. Further, when the first receiving coil Rc1 is completely magnetically coupled to the first transmitting coil Tc1, condition of the simulation can be intensity of the magnetic field detected at a position, of the second receiving coil Rc2, moved in a direction corresponding to a position at which the first receiving coil Rc1 moves to the right (a direction corresponding to a position in which the second transmitting coil Tc2 is placed).

As shown in FIG. 16, as the second receiving coil Rc2 moves in the direction of the second transmitting coil Tc2, the intensity of the magnetic field received at the second receiving coil Rc2 can decrease. In this case, an amount of reduction in magnetic field can increase as the separation distance (d) between the plate cores increases. In particular, the intensity of the magnetic field received at the second receiving coil Rc2 is remarkably reduced when plate cores are spaced apart by 2 mm.

Various substitutions, changes, and modifications can be made within a range that does not deviate from the technical idea of the present disclosure for those skilled in the art to which the present disclosure pertains, and the above-mentioned present disclosure is not limited to the above-mentioned embodiments and the accompanying drawings.

What is claimed is:

1. A wireless charging apparatus, comprising:
a plurality of plate cores spaced apart from one another by a predetermined distance;
at least one first coil disposed on each of at least one of the plurality of plate cores; and
at least one second coil disposed on the at least one first coil to partially overlap with the at least one first coil.

2. The wireless charging apparatus of claim 1, wherein one of the at least one first coil is disposed on each of the plate cores within an area formed by the corresponding plate core.

3. The wireless charging apparatus of claim 1, wherein one of the at least one first coil is disposed on each of the plate cores to partially overlap with an area formed by the corresponding plate core.

4. The wireless charging apparatus of claim 1, wherein a total number of coils including the at least first and second coils disposed above the plate cores is equal to a total number of the plate cores.

5. The wireless charging apparatus of claim 1, wherein the plate cores that are spaced apart from one another are positioned in a matrix configuration.

6. The wireless charging apparatus of claim 1, wherein two first coils among the at least one first coil are respectively disposed within two plate cores among the plate cores, and
wherein one second coil among the at least one second coil is disposed on portions of the two plate cores and overlaps portions of the two first coils.

7. The wireless charging apparatus of claim 1, further comprising a third coil and a fourth coil,
wherein a first specific coil among the at least one first coil is disposed on a first plate core among the plate cores,
wherein a second specific coil among the at least one second coil is disposed on a second plate core among the plate cores, and overlaps the first specific coil,
wherein the third coil overlaps the second specific coil, and
wherein the fourth coil overlaps the third coil.

8. The wireless charging apparatus of claim 1, wherein plural first coils among the at least one first coil are respectively disposed on plural first plate cores among the plate cores, and
wherein plural second coils among the at least one second coil are respectively disposed on plural second plate cores among the plate cores, and overlap the plural first coils.

9. The wireless charging apparatus of claim 8, further comprising a third coil and fourth coils,
wherein the third coil is disposed on a third plate core among the plate cores, and overlaps the plural second coils, and
wherein the fourth coils are respectively disposed on plural fourth plate cores among the plate cores, and overlap the third coil.

10. The wireless charging apparatus of claim 1, wherein a height compensating core is placed above the plate cores to compensate for a height difference between one of the at least one first coil and one of the at least one second coil.

11. The wireless charging apparatus of claim 1, further comprising an insulating sheet provided on the at least one first coil in an area in which the at least one first coil overlaps with the at least one second coil.

12. The wireless charging apparatus of claim 1, wherein separation distances between the plate cores are substantially the same.

13. A wireless charging system, comprising:
a wireless charging apparatus connected to an external power source and comprising a plurality of plate cores spaced apart from one another by a predetermined distance and a plurality of transmitting coils that overlap with the plurality of plate cores; and
at least one battery apparatus each comprising a receiving coil, and being configured to receive a charging power from the wireless charging apparatus through electromagnetic induction between at least one of the plurality of transmitting coils and the receiving coil and charge an internal battery.

14. The wireless charging system of claim 13, wherein the plurality of transmitting coils comprise:
a first coil disposed on the plurality of plate cores spaced apart from one another; and
a second coil disposed on the first coil to partially overlap with the first coil.

15. The wireless charging system of claim 13, wherein the at least one battery apparatus receives the charging power through any one group of transmitting coils, in which the plurality of transmitting coils are grouped based on positions of the plurality of plate cores.

16. The wireless charging system of claim 13, wherein the at least one battery apparatus is configured to receive the charging power from any one group of transmitting coils including transmitting coils or any one transmitting coil, which is closest to the receiving coil, among the plurality of transmitting coils disposed above the plurality of plate cores.

17. The wireless charging system of claim 16, wherein the wireless charging apparatus sequentially applies a current to the plurality of transmitting coils for a non-overlapping period of time, receives a response signal from the battery apparatus through the receiving coil into which a voltage is induced based on the current, and supplies the charging power from one or plural transmitting coils among the plurality of transmitting coils, based on the received intensity of the response signal.

18. The wireless charging system of claim 17, wherein when the current is applied to any one transmitting coil, and an intensity of the received response signal is greatest, the wireless charging apparatus determines a group of transmitting coils including the one transmitting coil associated with the greatest intensity, as a group of transmitting coils to supply the charging power, and selectively applies the current to the determined group of transmitting coils to supply the charging power to the at least one battery apparatus.

19. The wireless charging system of claim 17, wherein when the current is applied to any one transmitting coil and an intensity of the received response signal is greatest, the wireless charging apparatus determines the one transmitting coil associated with the greatest intensity as a transmitting coil to supply the charging power, and selectively applies the current to the determined transmitting coil to supply the charging power to the at least one battery apparatus.

20. The wireless charging system of claim 13, wherein the at least one battery apparatus is a plurality of battery apparatuses, and wherein when the plurality of battery apparatuses are placed on the plurality of plate cores, the wireless charging apparatus supplies the charging power to the plurality of battery apparatuses from a plurality of transmitting coils, among the plurality of transmitting coils disposed on the plurality of plate cores, which are closest to the plurality of receiving coils provided in the plurality of battery apparatuses.

* * * * *